(12) United States Patent
Frietsch et al.

(10) Patent No.: US 8,260,916 B2
(45) Date of Patent: Sep. 4, 2012

(54) NETWORK SERVER AND METHOD OF DISCOVERY OF A NETWORK NODE

(75) Inventors: Thomas Frietsch, Sindelfingen (DE); Michael Holzer, Ammerbuch (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1106 days.

(21) Appl. No.: 10/698,016

(22) Filed: Oct. 31, 2003

(65) Prior Publication Data

US 2005/0038889 A1 Feb. 17, 2005

(30) Foreign Application Priority Data

Aug. 15, 2003 (DE) .................................. 103 38 113

(51) Int. Cl.
*G06F 15/173* (2006.01)

(52) U.S. Cl. ........................................ 709/225; 709/222
(58) Field of Classification Search .................. 709/222, 709/225
See application file for complete search history.

(56) References Cited

U.S. PATENT DOCUMENTS

| 5,185,860 A | | 2/1993 | Wu | |
|---|---|---|---|---|
| 5,276,789 A | | 1/1994 | Besaw et al. | |
| 5,710,885 A | * | 1/1998 | Bondi | 709/224 |
| 5,790,548 A | * | 8/1998 | Sistanizadeh et al. | 370/401 |
| 6,411,997 B1 | * | 6/2002 | Dawes et al. | 709/224 |
| 2002/0010767 A1 | * | 1/2002 | Farrow et al. | 709/223 |
| 2003/0002075 A1 | * | 1/2003 | Osanai et al. | 358/1.15 |
| 2003/0005100 A1 | * | 1/2003 | Barnard et al. | 709/223 |

* cited by examiner

*Primary Examiner* — Thomas Dailey

(57) ABSTRACT

A network node in a computer network is discovered in response to a network node being reconnected to the network. The discovery procedure is initiated by an access request of the network node, such as a log on request or an IP address request.

19 Claims, 5 Drawing Sheets

NETWORK SERVER AND METHOD OF DISCOVERY OF A NETWORK NODE

RELATED APPLICATIONS

The present application is based on, and claims priority from, German Application Number 103 38 113.9, filed Aug. 15, 2003, the disclosure of which is hereby incorporated by reference herein in its entirety.

TECHNICAL FIELD

This invention relates to computer systems and more particularly to computer networks that interconnect network nodes, such as computers and computer peripherals. Even more particularly, the invention relates to discovery of network nodes.

BACKGROUND ART

Network Management Systems like the OpenView Network Node Manager product are designed to discover network topology (i.e., a list of all network node in a domain, their type, and their connections), monitor the health of each network node, and report problems to the network administrator. OpenView Network Node Manager (NNM) is a product distributed by Hewlett-Packard Company of Palo Alto, Calif.

The monitoring function of such a system is usually performed by a specialized computer program which periodically polls each network element and gathers data which is indicative of the network element's health. A monitor program typically runs on a single host. However, in distributed networks, monitors may run on various nodes in the network, with each monitor reporting its results to a centralized display.

Network discovery is performed periodically using Internet control message protocol (ICMP) polling (pings and mask requests), simple network management protocol (SNMP) polling and/or other diagnostic requests. In addition or as an alternative to these protocols Desktop Management Interface (DMI) or Windows Management Instrumentation (WMI) which is also referred to as WBEM can be used.

For example by means of SNMP polling a configuration check operation is performed on each node. By default this configuration check operation is performed once each day whereby this period is configurable. This way it is determined at periodic intervals if any relevant configuration information has changed since the last check. More technical detail of the internals of the NNM product is disclosed on (http://support.openview.hp.com/pdf/dev_ov_netmon96.pdf), the entirety of which is herein incorporated by reference.

Elements of the code for discovering the topology of a plurality of network elements and the code for periodically polling a plurality of network interfaces associated with the plurality of network elements are also disclosed in U.S. Pat. No. 5,185,860 of Wu entitled "Automatic Discovery of Network Elements, and in U.S. Pat. No. 5,276,789 of Besaw et al. entitled "Graphic Display of Network Topology". Both of these patents are hereby incorporated by reference for all that they disclose.

A disadvantage of scheduled discovery which is performed by the NNM product is that the discovery procedure can negatively affect network performance when the discovery procedure is carried out. This is why the discovery schedule is typically set such that the discovery procedure is carried out when the network load is low, i.e. during the night. However, performing the discovery at predetermined time intervals has the disadvantage that network nodes which are connected to the network only temporarily can be missed by the discovery. In particular this applies to portable computers, such as lap top computers which are frequently connected and disconnected to the network by means of a docking station.

SUMMARY OF THE INVENTION

The present invention provides a new and improved method of and apparatus for discovering a network node. Initially an access request is received from a network node. In response to the access request a discovery request is generated and transmitted to a discovery server. The discovery server performs a discovery procedure for the network node from which the access request has been received.

In comparison to a scheduled discovery the method and apparatus set forth in the immediately preceding paragraph has the advantage that network nodes, which are only temporarily connected to the network, are always discovered while making minimal usage of network bandwidth resources for the discovery procedure as not the whole network but only the network node identified by the access request is discovered. Another advantage is that no extra software needs to be installed on the network nodes as the discovery procedure can be initiated by a standard access request, such as a log on request or an Internet protocol (IP) address request.

A further advantage is that the unplanned discovery of network nodes can be performed centrally by one discovery server maintaining the discovery rules and collecting the discovery results or a few interconnected discovery servers. This greatly simplifies the network administration task.

In accordance with a preferred embodiment of the invention a discovery procedure is only performed for a given network node after a minimum amount of time has lapsed since the last discovery procedure had been performed. This way unnecessary discovery procedures are avoided when a network node is frequently disconnected and reconnected to the computer network. For example, the configuration of a lap top computer usually does not change very often. However, a lap top computer system can be removed and reconnected to the computer network within short time intervals, especially if a docking station is used.

In accordance with a further preferred embodiment of the invention the discovery procedure is initiated by a log on request received by a network server, such as a domain controller, from a network node. Typically the user of the network node needs to enter his or her user ID and password for authentication. After the log on procedure has been completed successfully a discovery request is generated and sent to a discovery server from the network server.

In accordance with a further preferred embodiment of the invention the network node request which initiates the discovery procedure is an IP address request. For example, when a computer peripheral, such as a printer, is connected to the computer network, the computer peripheral sends an IP address request which is processed by Dynamic Host Configuration Protocol (DHCP) server. The DHCP server assigns an IP address to the requesting network node. After the IP address has been assigned to the network node a discovery request is generated and transmitted to the discovery server together with the IP address.

BRIEF DESCRIPTION OF THE DRAWINGS

In the following preferred embodiments of the invention will be described, by way of example, and with reference to the drawings in which.

DETAILED DESCRIPTION OF THE DRAWING

Figure 1:
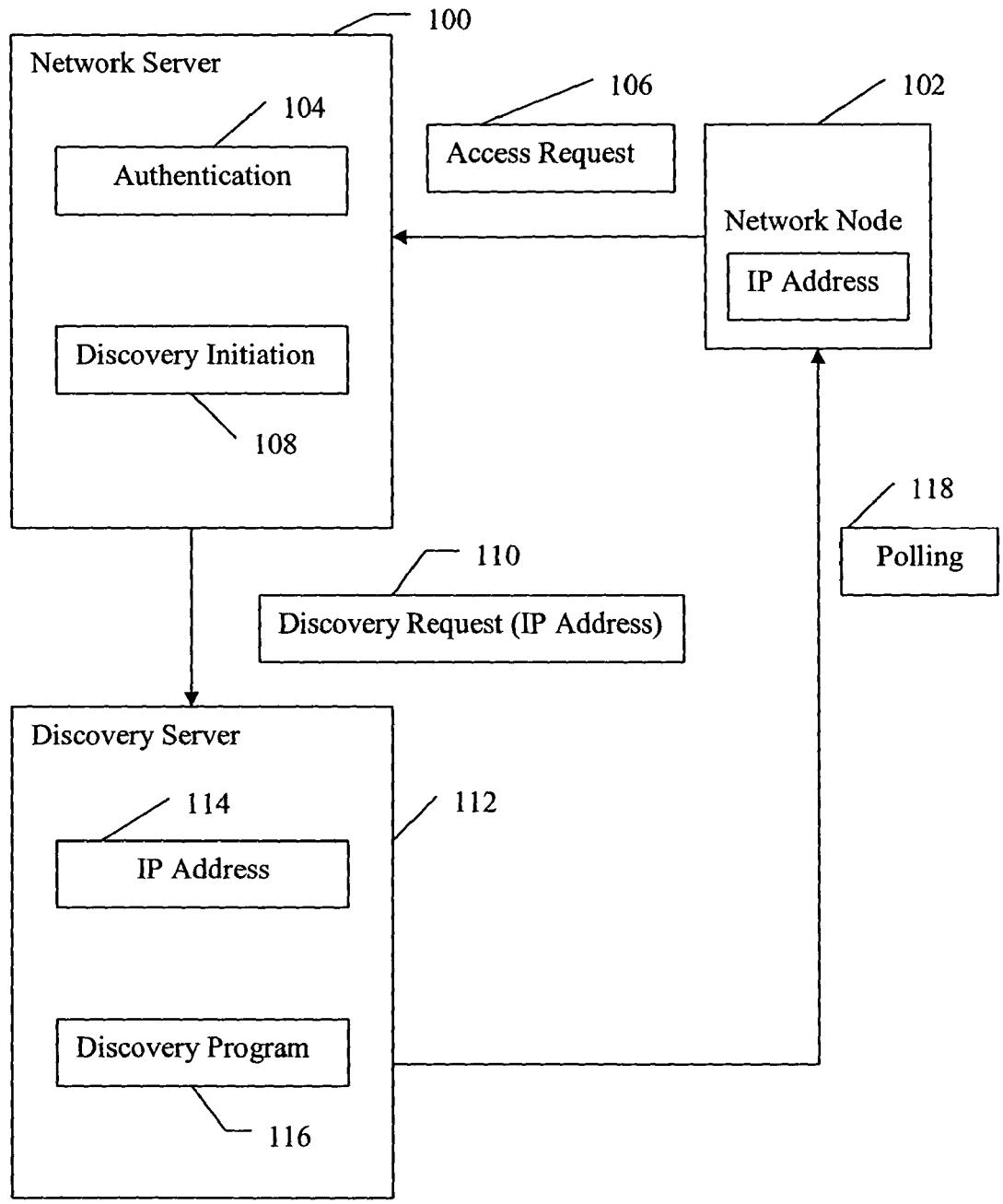
FIG. 1 is illustrative of a block diagram of a computer network having a network server being coupled to a discovery server.

FIG. 1 includes a network server 100 of a computer network having a plurality of network nodes. For ease of explanation only network node 102 of the computer network is shown in FIG. 1. Network node 102 is not permanently coupled to the computer network but is disconnected and reconnected from time to time. Network node 102 has an assigned IP address for addressing of network node 102 by means of the transmission control protocol/Internet protocol (TCP/IP).

Network server 100 has program component 104 for processing of access request 106 received from network node 102. For example program component 104 serves for authentication purposes of network node 102 and/or of a user of network node 102.

Further network server 100 has program component 108 which serves for initiation of a discovery procedure. After successful completion of the processing of access request 106 by program component 104, program component 108 generates discovery request 110 and sends discovery request 110 together with the IP address of network node 102 to discovery server 112.

Discovery server 112 has memory 114 for storing of the IP address received with discovery request 110. For example memory 114 is a FIFO buffer for storing a stack of IP addresses.

Discovery server 112 has discovery program 116 for performing a discovery procedure for network node 102. The discovery procedure is performed by ICMP and/or SNMP polls 118 in order to determine the network topology, i.e. other nodes to which network node 102 is connected, to discover configuration information of network node 102 and/or other status information of network node 102.

In operation, when network node 102 is physically connected to the network, it sends access request 106 to network server 100 in order to obtain access to the network resources. When access request 106 is received by network server 100 this invokes program component 104. Program component 104 processes access request 106. For example, program component 104 performs an authentication procedure prior to granting access to the network resources. After successful completion of the processing of access request 106 by program component 104 access is granted to network node 102 and program component 108 is invoked by program component 104.

Program component 108 generates discovery request 110 which comprises the IP address of network node 102. It is to be noted that in the embodiment considered here fixed IP addresses are being used, i.e. the IP address of network node 102 is assigned once and then fixed.

Program component 108 sends discovery request 110 with the IP address to discovery server 112. Discovery server 112 stores the IP address received with discovery request 110 in memory 114. Further discovery program 116 is invoked for performing a discovery procedure for network node 102 which is identified by its IP address. This is performed by ICMP and/or SNMP polls.

Discovery server 112 can receive a sequence of discovery requests 110 containing various IP addresses of various network nodes which have requested access to the computer network. This sequence of IP addresses is stored as a stack in memory 114. The stack of IP addresses is processed by discovery program 116 in first-in-first-out order.

It is to be noted that network server 100 and discovery server 112 are implemented on different server computers; alternatively network server 100 and discovery server 112 are implemented on the same server computer which is partitioned correspondingly. In particular the discovery server 112 can be implemented by any server computer running the relevant program, such as the network server computer 100.

Figure 2:
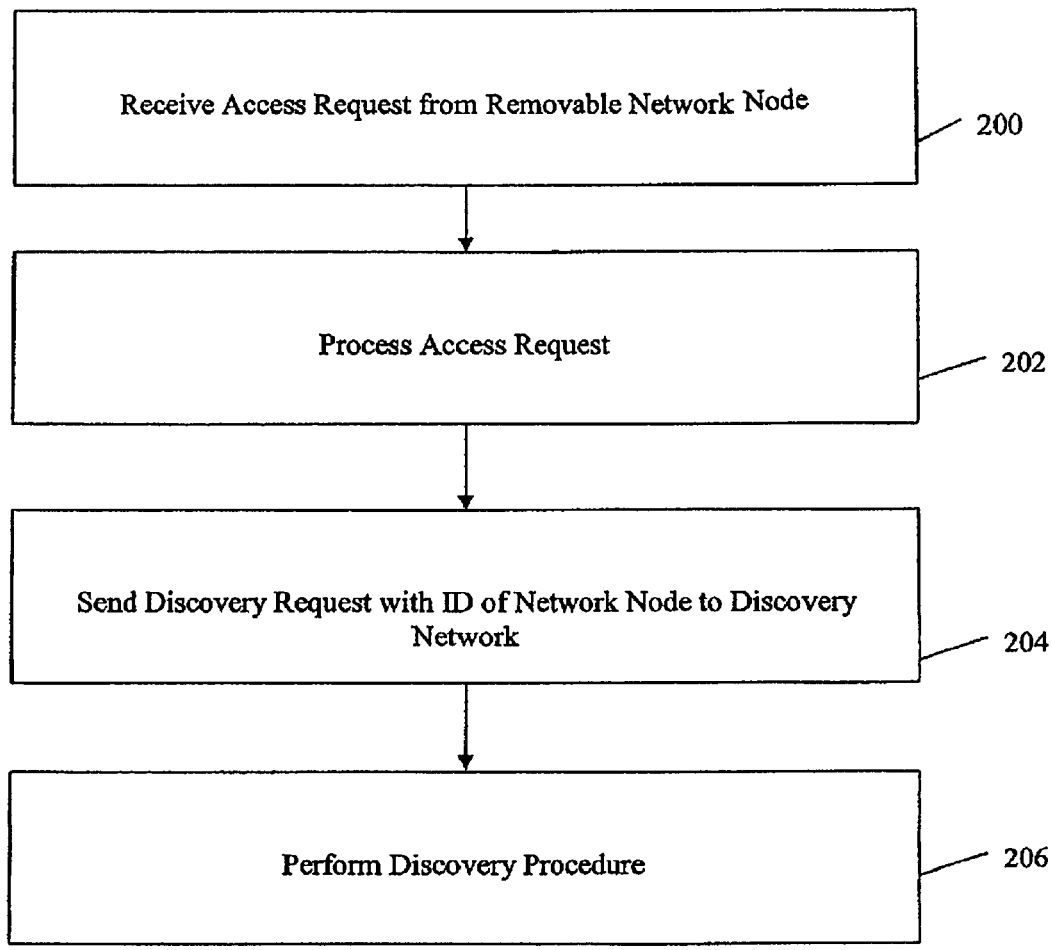
FIG. 2 is illustrative of a flow chart for performing a method of discovery of a network node.

FIG. 2 is a corresponding flowchart. In step 200 an access request is received from a removable network node which has been physically reconnected to the network. The access request from the network node is directed towards logical re-coupling of the network node to the computer network, i.e. the granting of access to network resources.

In step 202 the access request is processed. For example prior to granting of access the authenticity of the network node 102 and/or of its user and/or of its access rights are checked. After successful authentication and/or successful check of the access rights the network node is granted access to the network and is logically reconnected.

As indicated by step 204, in response to the logical reconnection of the network node a discovery request 110 is generated by server 100 and sent to the discovery server 112. The discovery request contains an identifier of the network node, such as its node ID. Preferably the IP address of the network node is used as a node ID.

Alternatively the name or other addressing information of the node can be used as an identifier. In response to the discovery request, the discovery server 112 performs a discovery procedure for the network node identified by the node ID in the discovery request in step 206.

The trigger for performing the discovery procedure of step 206 is the discovery request and not a prescheduled point of time. This means that a discovery procedure is only initiated if the network node is actually coupled to the network.

Figure 3:
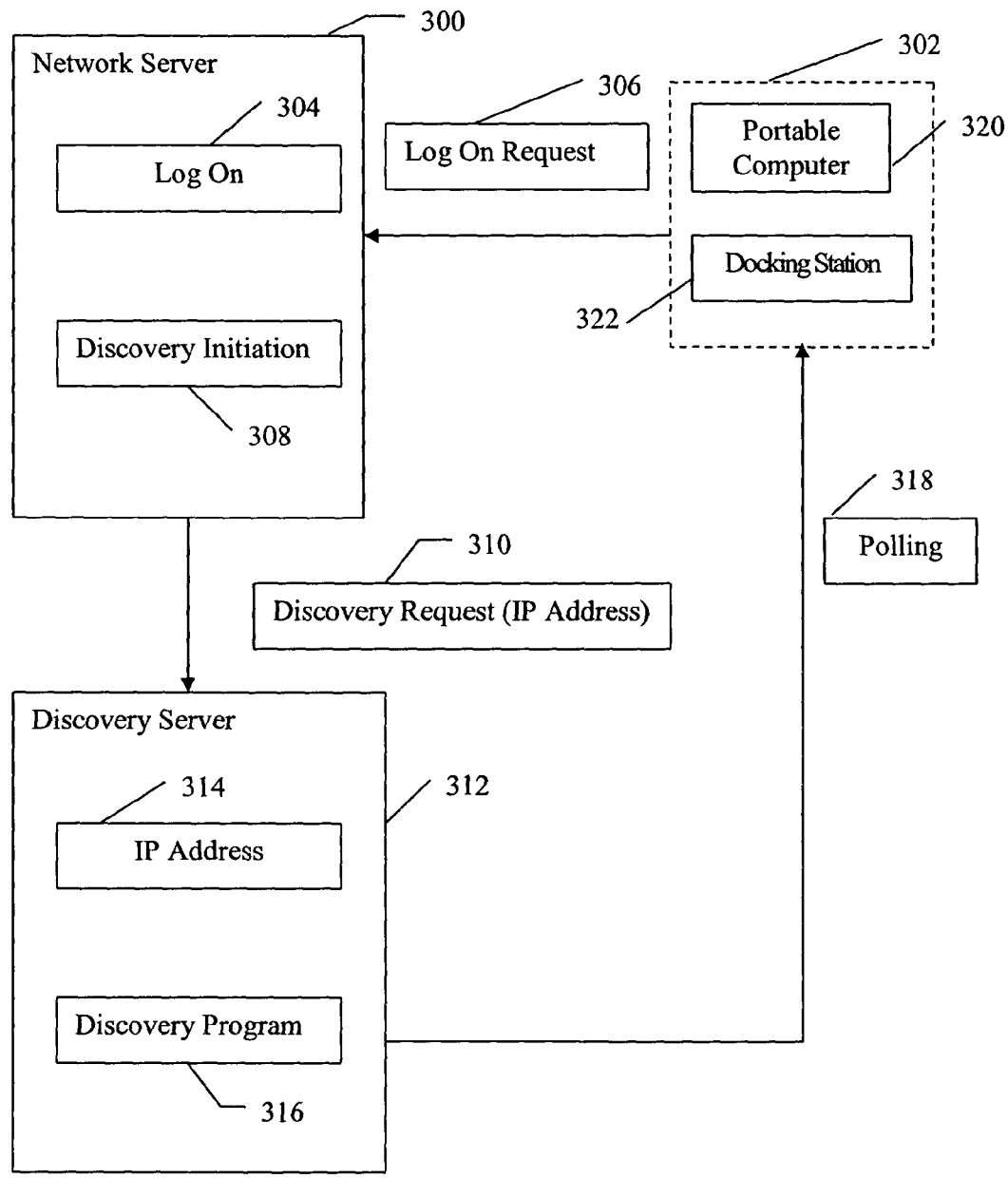
FIG. 3 is a block diagram of a computer network having a temporarily connected portable computer.

FIG. 3 is an alternative embodiment based on the embodiment of FIG. 1. Like elements of the embodiments of FIGS. 1 and 3 are designated by like reference numerals having added 200 to the reference numerals in the embodiment of FIG. 3.

In the embodiment shown in FIG. 3 network node 302 comprises portable computer 320 which is physically coupled to the computer network through docking station 322. For example portable computer 320 is a lap top computer, palm top computer or other mobile computing device.

In operation portable computer 320 is reconnected to the computer network by inserting portable computer 320 into docking station 322 and booting portable computer 320. Next a log on dialogue is started between network server 300 and portable computer 320.

If a Microsoft windows operating system is used network server 300 plays the role of a domain controller for portable computer 320. Log on request 306 is processed by program component 304 of network server 300. When the user of portable computer 320 has correctly entered a valid user ID and password, portable computer 320 is logged on and is thus logically reconnected to the network.

As a consequence, program component 304 invokes program component 308 for initiation of the discovery procedure for portable computer 320. The IP address of portable computer 320 which is known to network server 300 is transmitted as part of discovery request 310 to discovery server 312 which performs a discovery procedure analogous to the discovery procedure as explained above with respect to FIGS. 1 and 2.

Figure 4:
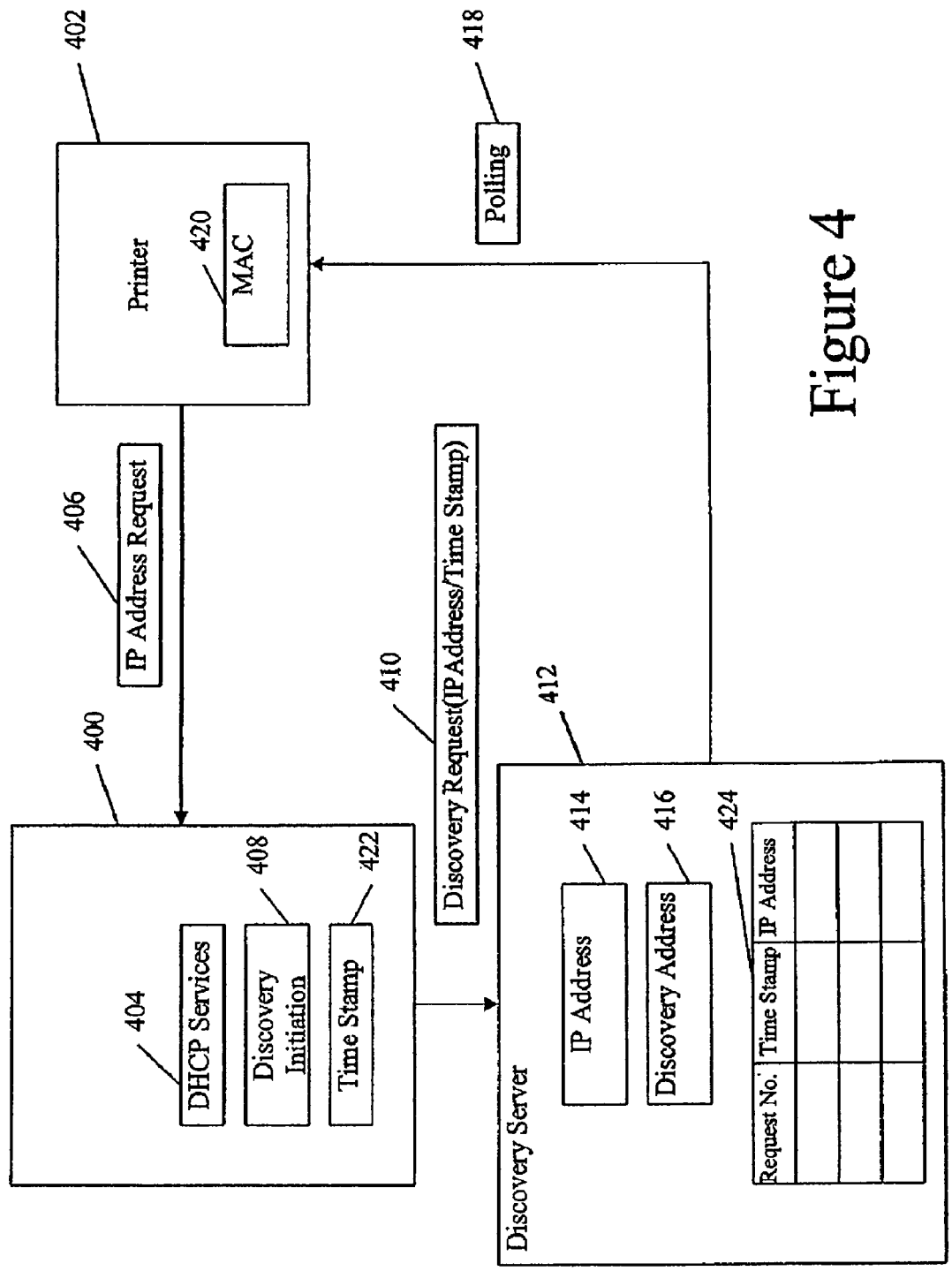
FIG. 4 is illustrative of a block diagram of a computer network having a DHCP server.

FIG. 4 is a block diagram of a further preferred embodiment where like elements are referenced by like reference numerals as in FIG. 1 having added 300 to the reference numerals.

In the embodiment shown in FIG. 4 network server 400 is a DHCP server. DHCP provides automated configuration services including automated assignment of IP addresses. Network server 400 has a corresponding DHCP services program component 404.

In the preferred embodiment considered here, network node 402 is a computer peripheral device, such as a printer. Computer peripheral 402 has a media access control (MAC) address which is stored in permanent storage 420 of computer peripheral 402.

Network server 400 has time stamp program component 422. Time stamp program component 422 serves to provide a time stamp for discovery request 410 which is generated by program component 408 for discovery initiation.

In operation when computer peripheral 402 is physically coupled to the computer network an IP address request 406 is automatically generated by computer peripheral 402 based on the MAC address stored in storage 420 in accordance with the DHCP protocol. In response to IP address request 406 network server 400 invokes DHCP services program component 404 for processing of IP address request 406.

DHCP services program component 404 assigns an IP address to computer peripheral 402. Next program component 408 is invoked which generates discovery request 410 which includes the newly assigned IP address of computer peripheral 402. Discovery request 410 is time stamped by time stamp program component 422 and then sent from network server 400 to discovery server 412.

Discovery server 412 has a discovery log file 424 in which the IP addresses and time stamps of previously received discovery requests for which discovery procedures have been performed are stored. For example discovery log 424 has a tabular structure, e.g. for each request a request number, time stamp and IP address are stored in the discovery log 424. Discovery server 412 queries discovery log 424 using the IP address of discovery request 410 as a key. If an entry in discovery log 424 with that IF address is identified the corresponding time stamp stored in the discovery log 424 and the time stamp of discovery request 410 are compared.

If time stamp of discovery request 410 is a predetermined amount of time later then the time stamp stored in discovery log 424 the IP address of discovery request 410 is entered into memory 414 in order to initiate a corresponding discovery procedure by discovery program 416. If the contrary is the case discovery request 410 is refused. This way unnecessary discovery procedures are avoided when computer peripheral 402 is frequently removed and reconnected to the computer network. For example the predetermined amount of time can be set to 6, 12 or 24 hours.

As an alternative to time stamping discovery request 410 by time stamp program component 422, the reception time of discovery request 410 can be used as a time reference. In this instance time stamp program component 422 is not required. This minimizes the complexity of the DHCP Server 400.

Again, it is to be noted that network server 400 and discovery server 412 are implemented on different server computers; however, network server 400 and discovery server 412 can also be implemented on the same server computer which is partitioned correspondingly.

Figure 5:
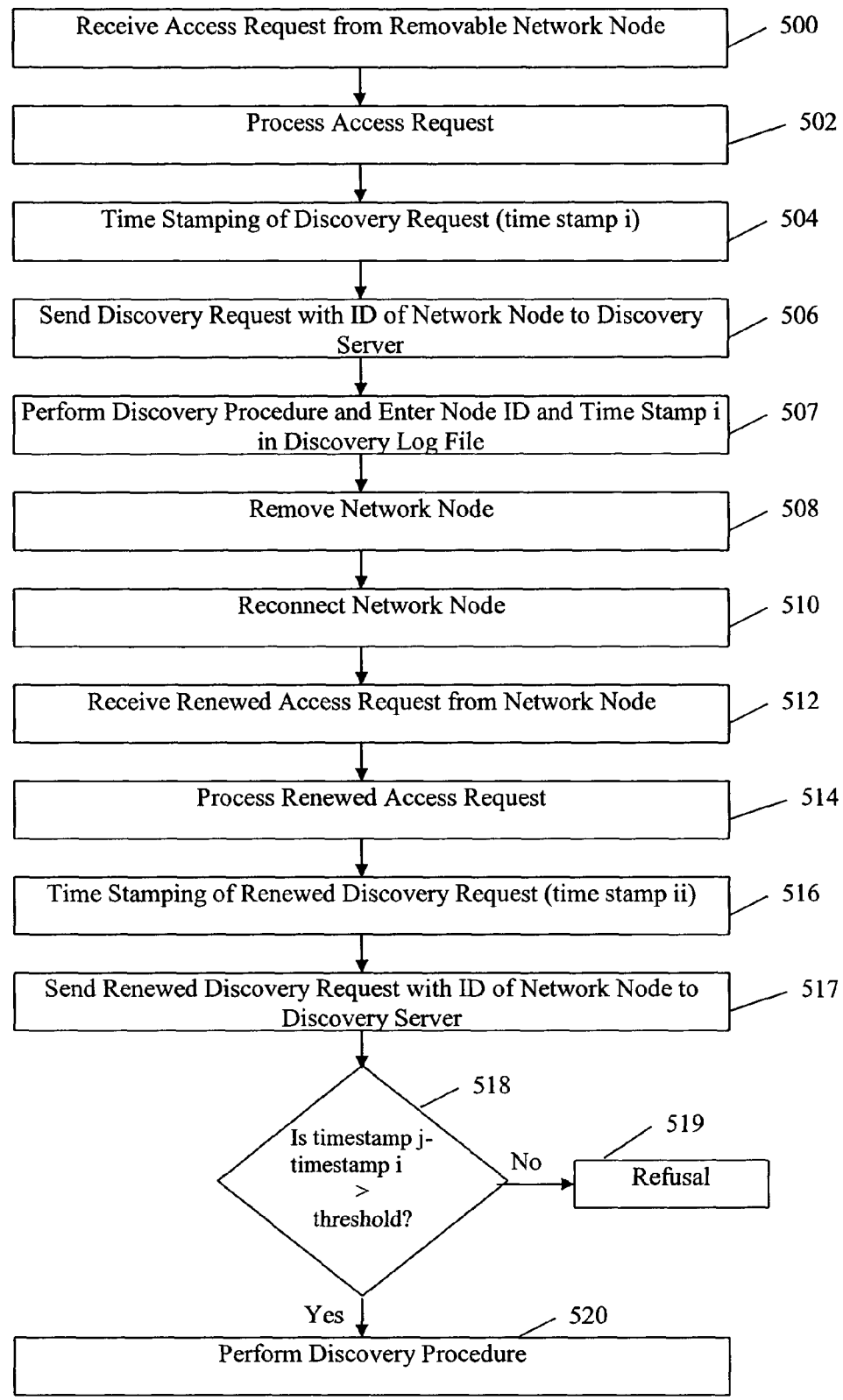
FIG. 5 is illustrative of a flow chart of an alternative method of discovery of the network node.

FIG. 5 is a corresponding flow chart. In step 500 an access request 406 from peripheral device 402 (e.g. a printer) is received by a network server 400 from a network node 402 which has been physically reconnected to the network. In step 502 the access request is processed by the network server 400. After successful completion of the processing in step 502, i.e. when the network node 402 is logically reconnected to the network, a discovery request is generated in step 504 and is time stamped by component 422 with a time stamp i.

In step 506 the time stamped discovery request is sent to the discovery server. In response, the discovery server 412 performs a discovery procedure and enters the node ID of the network node for which the discovery procedure has been performed together with time stamp i in a discovery log file; step 507.

In step 508 the network node 402 is removed from the network. In step 510 the network node 402 is reconnected to the network. As a consequence, a renewed access request from the reconnected network node 402 is received by the network server 412 in step 512. The renewed access request is processed in step 514 and time stamped with time stamp j in step 516, before the time stamp discovery request is sent to the discovery server in step 517.

When the renewed discovery request is received by the discovery server 414 the discovery server checks if time stamp j minus time stamp i is above a predefined threshold. In other words, the discovery server 414 checks if a sufficient amount of time has lapsed between the first discovery request for which a discovery procedure has been performed in step 507 and the subsequent discovery request with time stamp j. This check is performed in step 518.

If the amount of time which has lapsed between the two subsequent discovery requests is below the threshold the control goes to step 519 where the renewed discovery request is rejected. If the contrary is the case a renewed discovery procedure is carried out in step 520.

The invention claimed is:

1. A method of discovering that a particular network node has been connected to a computer network, wherein the network includes (a) plural nodes, one of which is the particular node, and (b) a server arrangement including a network portion and a discovery portion, the method comprising:

responding to an establishment of a connection of the particular network node to the network, the network portion of the server arrangement receiving an access request from the particular network node, wherein the particular network node has an assigned address assigned by a device in the network;

in response to receiving the access request, the network portion authenticating the particular network node;

the network portion sending a discovery request and the assigned address of the particular network node to the discovery portion of the server arrangement after the network portion has successfully authenticated the particular network node;

the discovery portion storing the assigned address of the particular network node and initiating a discovery program that performs a discovery procedure for that particular network node;

the discovery procedure for the particular network node, initiated by the discovery request from the network portion, including polling other nodes in the network to determine a network topology, the polled network topology including at least some of the other nodes to which the particular network node is connected, and to determine the configuration of the particular network node.

2. The method of claim 1 wherein the discovery portion receives a sequence of discovery requests including assigned addresses of various nodes of the network which have requested access to the network, the discovery portion storing the assigned addresses of the received requests from the various nodes.

3. The method of claim 2 wherein the discovery portion stores the assigned addresses as a stack that the discovery portion processes in a first-in-first-out order.

4. A non-transitory storage medium storing machine-readable instructions to discover that a particular network node has been connected to a computer network, wherein the network includes (a) plural nodes, one of which is the particular node, and (b) a server arrangement including a network portion and a discovery portion, wherein the machine-readable instructions when executed by a processor cause the processor:

to respond to an establishment of a connection of the particular network node to the network, the network portion of the server arrangement receiving an access request from the particular network node, wherein the particular network node has an assigned address assigned by a device in the network;

in response to receiving the access request, the network portion to authenticate the particular network node;

the network portion to send a discovery request and the assigned address of the particular network node to the discovery portion of the server arrangement after the network portion has successfully authenticated the particular network node;

the discovery portion to store the assigned address of the particular network node and initiating a discovery program that performs a discovery procedure for the particular network node;

the discovery procedure for the particular network node, initiated by the discovery request from the network portion, including polling other nodes in the network to determine a network topology, the polled network topology including at least some of the other nodes to which the particular network node is connected, and to determine the configuration of the particular network node.

5. The non-transitory storage medium of claim 4 wherein the discovery portion receives a sequence of discovery requests including assigned addresses of various nodes of the network which have requested access to the network, the discovery portion storing the assigned addresses of the received requests from the various nodes.

6. The non-transitory storage medium of claim 5 wherein the discovery portion stores the assigned addresses as a stack that the discovery portion processes in a first-in-first-out order.

7. A server arrangement including machine-readable information executed by a processor, the server arrangement for discovering that a particular network node has been connected to a computer network, wherein the particular network node has an assigned address assigned by a device in the network, the server arrangement including:

a network portion and a discovery portion;

the network portion being arranged to, responding to an establishment of a connection of the particular network node to the network, receive an access request from the particular network node;

the network portion being arranged to authenticate the particular network node in response to receiving the access request;

the network portion being arranged to send a discovery request and the assigned address of the particular network node to the discovery portion after the network portion has successfully authenticated the particular network node;

the discovery portion being arranged to store the assigned address of the particular network node and initiating a discovery program that performs a discovery procedure for the particular network node; and the discovery procedure for the particular network node, initiated by the discovery request from the network portion, including polling other nodes in the network to determine a network topology, the polled network topology including at least some of the other nodes to which the particular network node is connected, and to determine the configuration of the particular network node.

8. The server arrangement of claim 7 wherein the discovery portion is arranged to receive a sequence of discovery requests including assigned addresses of various nodes of the network which have requested access to the network and includes a storage for storing the assigned addresses on the received requests from the various nodes.

9. The server arrangement of claim 8 wherein the storage is arranged to store the assigned addresses as a stack, the discovery portion being arranged to process the stack in a first-in-first-out order.

10. A server arrangement including machine-readable information executed by a processor, the server arrangement for discovering that a particular network node has been connected to a computer network, wherein the particular network node has an address assigned by a device in the network, the server arrangement including:

a network portion and a discovery portion;

the network portion being arranged to, responding to an establishment of a connection of the particular network node to the network, receive an access request from the particular network node;

the network portion being arranged to authenticate the particular network node in response to receiving the access request;

the network portion being arranged to send a discovery request and the assigned address of the particular network node to the discovery portion after the network portion has successfully authenticated the particular network node;

the discovery portion being arranged to store the assigned address of the particular network node and initiating a discovery program that performs a discovery procedure for the particular network node;

the discovery procedure for the particular network node, initiated by the discovery request from the network portion, including polling other nodes in the network to determine a network topology, the polled network topology including at least some of the other nodes to which the particular network node is connected, and to determine the configuration of the particular network node.

11. The server arrangement of claim 10 wherein the discovery portion is arranged to receive a sequence of discovery requests including assigned addresses of various nodes of the network which have requested access to the network and includes a storage for storing the assigned addresses on the received requests from the various nodes.

12. The server arrangement of claim 11 wherein the storage is arranged to store the assigned addresses as a stack, the discovery portion being arranged to process the stack in a first-in-first-out order.

13. A computer network for discovering that a particular network node has been connected to the computer network, the network comprising:
- a server arrangement including machine-readable information executed by a processor; and
- plural nodes, one of which is the particular network node, wherein the particular network node is assigned an addressed by the network;
- the server arrangement including:
  - a network portion and a discovery portion, the network portion being arranged to, responding to an establishment of a connection of the particular network node to the network, receive an access request from the particular network node,
  - the network portion being arranged to authenticate the particular network node in response to receiving the access request,
  - the network portion being arranged to send a discovery request and the assigned address of the particular network node to the discovery portion after the network portion has successfully authenticated the particular network node,
  - the discovery portion being arranged to store the assigned address of the particular network node and initiating a discovery program that performs a discovery procedure for the particular network node, and
  - the discovery procedure for the particular network node, initiated by the discovery request from the network portion, including polling other nodes in the network to determine a network topology, the polled network topology including at least some of the other nodes to which the particular network node is connected, and to determine the configuration of the particular network node.

14. The computer network of claim 13 wherein the discovery portion is arranged to receive a sequence of discovery requests including assigned addresses of various nodes of the network which have requested access to the network and includes a storage for storing the assigned addresses on the received requests from the various nodes.

15. The method of claim 1, wherein the particular network node includes a portable computer and a docking station, the docking station responding to the portable computer being initially connected to the docking station by booting the portable computer and performing a logon dialog between the network portion of the server arrangement and the portable computer;
- the logon dialog being the access request;
- the network portion of the server arrangement responding to the logon dialog from the portable computer by authenticating the portable computer; and
- the server arrangement, when connected to the authenticated portable computer, functioning as a domain controller for the portable computer.

16. The non-transitory storage medium of claim 4, wherein the particular network node includes a portable computer and a docking station, the docking station responding to the portable computer being initially connected to the docking station by booting the portable computer and performing a logon dialog between the network portion of the server arrangement and the portable computer;
- the logon dialog being the access request;
- the network portion of the server arrangement responding to the logon dialog from the portable computer by authenticating the portable computer; and
- the server arrangement, when connected to the authenticated portable computer, functioning as a domain controller for the portable computer.

17. The server arrangement of claim 7, wherein the particular network node includes a portable computer and a docking station, the docking station responding to the portable computer being initially connected to the docking station by booting the portable computer and performing a logon dialog between the network portion of the server arrangement and the portable computer;
- the logon dialog being the access request;
- the network portion of the server arrangement responding to the logon dialog from the portable computer by authenticating the portable computer; and
- the server arrangement, when connected to the authenticated portable computer, functioning as a domain controller for the portable computer.

18. The server arrangement of claim 10 wherein the particular network node includes a portable computer and a docking station, the docking station responding to the portable computer being initially connected to the docking station by booting the portable computer and performing a logon dialog between the network portion of the server arrangement and the portable computer;
- the logon dialog being the access request;
- the network portion of the server arrangement responding to the logon dialog from the portable computer by authenticating the portable computer; and
- the server arrangement, when connected to the authenticated portable computer, functioning as a domain controller for the portable computer.

19. The computer network of claim 13, wherein the particular network node includes a portable computer and a docking station, the docking station responding to the portable computer being initially connected to the docking station by booting the portable computer and performing a logon dialog between the network portion of the server arrangement and the portable computer;
- the logon dialog being the access request;
- the network portion of the server arrangement responding to the logon dialog from the portable computer by authenticating the portable computer; and
- the server arrangement, when connected to the authenticated portable computer, functioning as a domain controller for the portable computer.

* * * * *

UNITED STATES PATENT AND TRADEMARK OFFICE
CERTIFICATE OF CORRECTION

PATENT NO. : 8,260,916 B2
APPLICATION NO. : 10/698016
DATED : September 4, 2012
INVENTOR(S) : Thomas Frietsch et al.

It is certified that error appears in the above-identified patent and that said Letters Patent is hereby corrected as shown below:

In column 9, line 8, in Claim 13, delete "addressed" and insert -- address --, therefor.

Signed and Sealed this
Twelfth Day of February, 2013

Teresa Stanek Rea
*Acting Director of the United States Patent and Trademark Office*